UNITED STATES PATENT OFFICE.

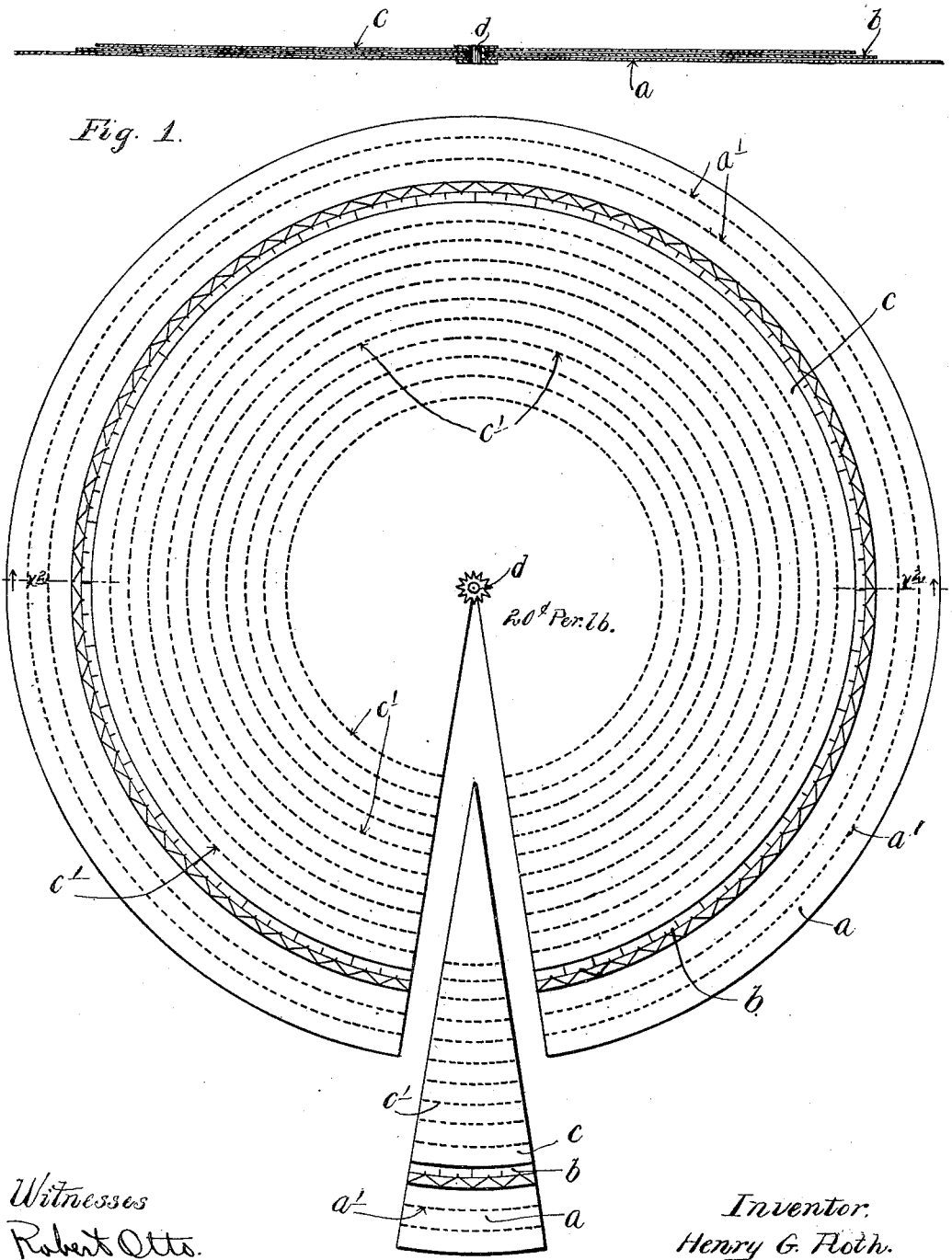

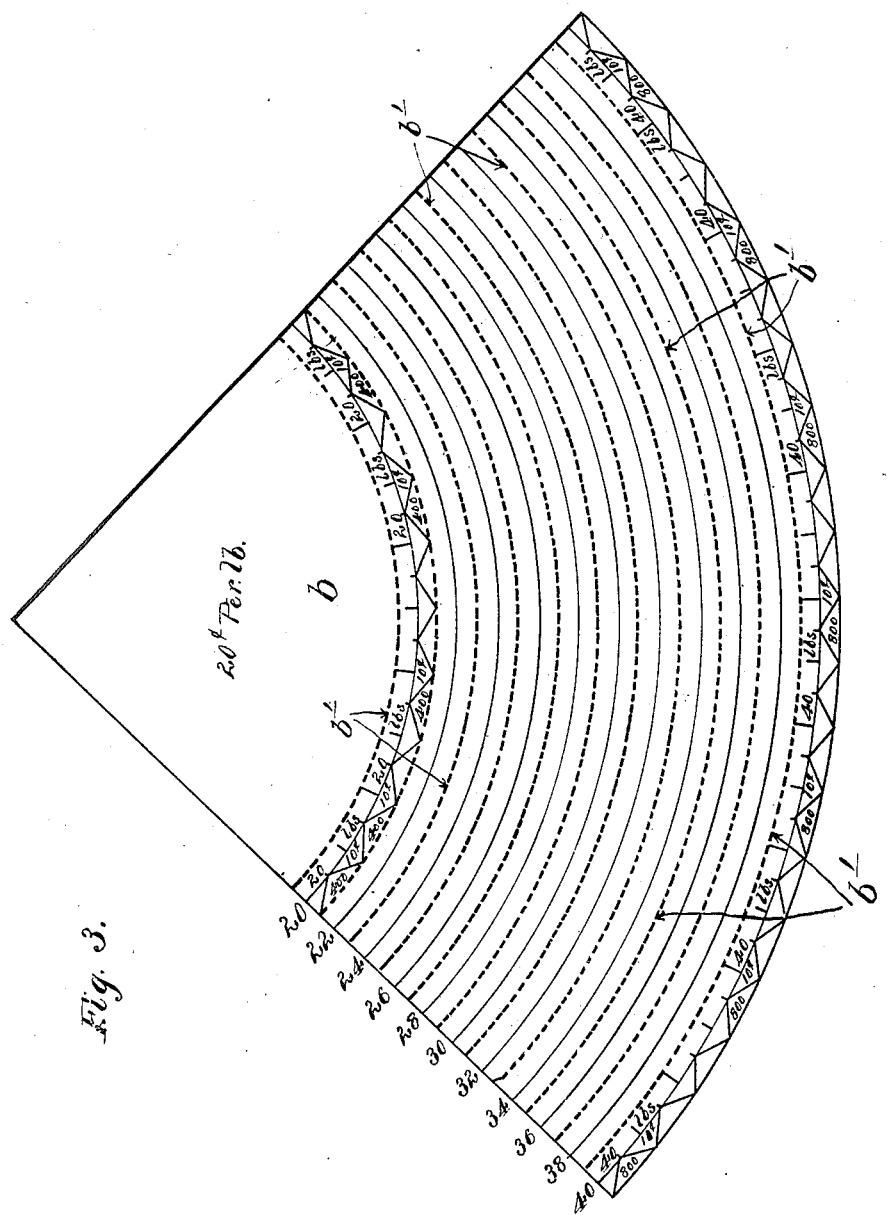

HENRY G. ROTH, OF MINNEAPOLIS, MINNESOTA.

CUTTING-SCALE FOR CHEESE.

SPECIFICATION forming part of Letters Patent No. 657,620, dated September 11, 1900.

Application filed May 17, 1900. Serial No. 16,972. (No model.)

*To all whom it may concern:*

Be it known that I, HENRY G. ROTH, a citizen of the United States, residing at Minneapolis, in the county of Hennepin and State of Minnesota, have invented certain new and useful Improvements in Cutting-Scales for Cheese; and I do hereby declare the following to be a full, clear, and exact description of the invention, such as will enable others skilled in the art to which it appertains to make and use the same.

My present invention has for its object to provide a chart or cutting-scale adapted for application to a flat and round or circular cake or block of cheese or other commodity and by the use of which such cake or block, regardless of its size, weight, and value, may be subdivided either according to fractions in pounds or in fractions of the total selling price of the cheese.

To the ends above indicated the invention consists of the novel devices and combinations of devices hereinafter described, and defined in the claims.

The invention is illustrated in the accompanying drawings, wherein like characters indicate like parts throughout the several views.

Figure 1 is a plan view showing my improved scale or chart as applied to a cake of cheese or other commodity, a section thereof being cut and partially removed. Fig. 2 is a transverse section on the line $x^2 x^2$ of Fig. 1, but showing the parts of the device slightly separated; and Fig. 3 is a plan view, on an enlarged scale, showing a segment of the scale or chart proper.

The invention in its preferred form will be specifically described.

As illustrated in Fig. 1, the complete scale is preferably made up of three disks $a$, $b$, and $c$, concentrically secured at their centers by a metallic eyelet $d$. The disks are preferably made of quite thin and tough paper gummed on their under sides for use, as hereinafter specified, and they are provided, respectively, with concentric circles of perforations $a'$ $b'$ $c'$, which adapt the marginal portions thereof to be torn from the bodies, as also hereinafter described. The disk $b$ is the scale member or chart proper, and the spaces between the concentric perforations $b'$ are independently subdivided, each zone being appropriated to a cheese of a given weight and graduated to indicate the segments of that cheese in pounds and fractions thereof and in fractions of the total retail value of the cheese at a certain price per pound which should be cut for a given weight or for a certain sum of money. To illustrate by specific example, the chart $b$ illustrated in the drawings is graduated for cheeses varying in weight from twenty to forty pounds, to be sold at a retail price of twenty cents per pound. The outer zone of the chart-disk $b$, for instance, is appropriated to a forty-pound cheese, and hence is subdivided into forty equal parts to indicate pound-segments, and still further subdivided to indicate fractions of a pound. In the drawings light unbroken circles are shown as extending concentrically through each zone to separate the said zones into concentric halves. These unbroken lines are not essential, but serve to separate the pound and the price graduations. The inner half or annular section of the zone marked "40 pounds," for instance, is divided into forty equal parts to indicate the pounds and still further subdivided to indicate halves and quarters of a pound, while the outer annular section of the said "40" zone is marked at intervals "800," which indicates eight hundred cents or eight dollars, and is subdivided to indicate segments which should be cut for any certain sum of money in units of ten cents. To still further illustrate, a forty-pound cheese at twenty cents a pound should bring eight dollars or eight hundred cents, and hence for ten cents a purchaser should receive a segment of the cheese equal to one-eightieth of the whole cake. Hence the outer half of the forty-pound zone is divided by short radial lines or otherwise into eighty equal parts that are subdivided by a zigzag line that cuts the half zone into a series of triangles. The extreme length of each triangle indicates a ten-cent segment of cheese, while one-half or one-quarter of such triangle indicates, respectively, a five-cent or a two-and-a-half-cent segment. As illustrated in Fig. 3, the inwardly-diverging triangles are marked "10 cents" to indicate the value of a segment of that extent, while the outwardly-diverging triangles are marked "800" to indicate the total retail value of the cheese. In Fig. 1 the numerals or notations are left off from the exposed section of the chart or disk *b*, and in Fig. 3 the graduations and notations are shown as carried out for the twenty-pound and forty-pound zones only; but the manner of filling in the other zones will of course be understood from the description and illustrations already given.

The manner of applying the device to a cheese is as follows: The larger disk *a* is placed upon the cheese concentric therewith, and its outer marginal portion is concentrically torn away on the line of one or the other of the perforated segments *a'*, so as to make the said disk of the same diameter as the cheese. The said disk *a* is then moistened and stuck to the cheese. If the cheese happens to be a forty-pound cake, the chart-disk *b* would be left intact, and the upper disk or shield *c* being also left intact will leave exposed only the outer or forty-pound zone of the disk *b*, as shown in Fig. 1. For a twenty-pound cheese all of that portion of the said disk outward of the "20" zone would be torn away, and the upper disk or shield *c* would also be torn away on the inner circular line of the said "20" zone. In short, in any case where the selling price is that indicated on the chart *b*—to wit, in the illustration given, twenty cents per pound—the disks *b* and *c* should be so torn on the lines of their concentric perforations *b' c'*, respectively, that only one zone of the said disk *b*—to wit, that zone which corresponds to the weight of the cheese—will be exposed. After the disks *b* and *c* are properly torn they should be moistened and stuck together and to the centering-disk *a*. When the scale or chart is applied to the cheese, as above indicated, the salesman may very quickly and accurately determine and cut either according to weight or sum of money a segment of cheese of the proper size. By placing the end of the cheese-knife in one of the serrations of the eyelet *d*, with its intermediate portion intersecting the proper indication on the exposed zone of the disk *b*, the segment of cheese may be very accurately determined and cut. In Fig. 1 the section shown as cut is a two-pound or a forty-cent segment, which is apparent from the fact that it contains two of the pound-mark indications and four of the ten-cent indications. Thus it will be seen that the segment of the scale or chart which adheres to the segment of cheese cut from the main body will indicate to the purchaser the amount of cheese, both in weight and in value, that he receives.

In most cases it is proposed to furnish two scales or complete charts for each price per pound at which the different cheeses may be sold, the one chart containing the even pounds and the other the odd pounds, between whatever limits may be found necessary or desirable. A single chart might contain both the odd and even pounds; but this produces either a very large chart or one that must be very closely figured and graduated. It is, however, possible to use one of the charts in several different ways. For instance, with the chart illustrated, which is calculated at twenty cents per pound, it is possible to cut a forty-pound cheese which, for instance, is worth at retail price fifteen cents per pound. In this case if the cheese is to be cut by the pound the forty-pound graduation may be read the same as in the illustration above given, inasmuch as price is not considered. However, a forty-pound cheese at fifteen cents per pound should sell for six dollars, which is the same as a thirty-pound cheese sold at twenty cents per pound. Therefore in cutting by price on the twenty-cent-per-pound scale the ten-cent graduations of the thirty-pound zone should be followed. In this case to enable the salesman to readily follow the proper price markings the shield or upper disk *c* should be torn away on the inner circular line of the thirty-pound zone.

The great object sought to be obtained by the use of this device is to enable the salesman to so cut the cheese that each purchaser will receive just the amount of cheese that he pays for and that the merchant will receive when the entire cheese is sold the full amount which he should have received, or, in other words, the total retail price of the cake of cheese of a given weight at a certain selling price per pound. This is done with the above device by preventing both over and under weights. It will of course be understood that very slight overweights to a large number of purchasers of small sections of the cheese will make the merchant considerably short by the time the cheese is completely sold.

The device above described, it will of course be understood, is capable of many modifications in its details of construction and arrangement of parts within the scope of my invention.

The disks characterized by the members *a* and *c*, while important, may, nevertheless, in many cases be dispensed with. The centering-disk *a* instead of being secured to the cheese by the adhesive material may be tacked thereto. However, whether adhesive material is used or not a wire nail or brad *f* is preferably driven through the eyelet *d* and into the cake of cheese to hold the entire device properly centered.

What I claim, and desire to secure by Letters Patent of the United States, is as follows:

1. A cutting-scale or chart for cheeses, &c., formed of material adapted to be readily cut with a knife and securable to one face of a cake of cheese, said chart having circular graduations indicating fractions or subdivisions of the total cheese, the section of the chart cut and remaining attached to the cut segment of the cheese indicating the fraction cut, substantially as described.

2. A cutting-scale or chart for cheeses, &c., in the form of a paper disk having concentric zones separated by perforated circles adapting the same to be torn, the said zones being graduated to indicate fractions or subdivisions of the total of cheese, substantially as described.

3. A scale for cutting cheese, &c., comprising in combination the centering-disk $a$ with concentric lines of perforations $a'$, and the disk $b$ separated into concentric zones by the perforate circles $b'$, each zone being graduated and marked to indicate fractions or subdivisions of the cheese, substantially as described.

4. A cutting-scale for cheeses, &c., comprising in combination the disks $a$, $b$ and $c$ connected at their centers by the eyelet $d$, said disk $b$ being graduated and marked to indicate fractions or subdivisions of the total cheese, substantially as described.

In testimony whereof I affix my signature in presence of two witnesses.

HENRY G. ROTH.

Witnesses:
 CHAS. S. DOW,
 L. F. DOW.